United States Patent
Ateya et al.

(10) Patent No.: US 9,898,529 B2
(45) Date of Patent: Feb. 20, 2018

(54) AUGMENTING SEMANTIC MODELS BASED ON MORPHOLOGICAL RULES

(71) Applicant: International Business Machines Corporation, Armonk, NY (US)

(72) Inventors: Ibrahim M. S. A. Ateya, Riyadh (SA); Ahmed M. A. Nassar, Katy, TX (US); Tore Notland, Stavanger (NO); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 14/318,750

(22) Filed: Jun. 30, 2014

(65) Prior Publication Data

US 2015/0378984 A1    Dec. 31, 2015

(51) Int. Cl.
*G06F 17/30* (2006.01)
*G06F 17/27* (2006.01)

(52) U.S. Cl.
CPC .... *G06F 17/30684* (2013.01); *G06F 17/2755* (2013.01); *G06F 17/30731* (2013.01)

(58) Field of Classification Search
CPC ................................................. G06F 17/30684
USPC ....................................................... 707/738
See application file for complete search history.

(56) References Cited

U.S. PATENT DOCUMENTS

| | | | |
|---|---|---|---|
| 5,386,556 A | 1/1995 | Hedin et al. | |
| 9,317,595 B2* | 4/2016 | Li | G06F 17/2775 |
| 2004/0202450 A1* | 10/2004 | Rising, III | H04N 9/8205 |
| | | | 386/248 |
| 2007/0244942 A1* | 10/2007 | McCamant | G06F 11/3612 |
| 2013/0013291 A1 | 1/2013 | Bullock et al. | |
| 2013/0191109 A1 | 7/2013 | Anisimovich et al. | |
| 2013/0262501 A1* | 10/2013 | Kuchmann-Beauger | G06F 17/30451 |
| | | | 707/769 |
| 2014/0330871 A1 | 11/2014 | Rojahn | |
| 2016/0140236 A1 | 5/2016 | Estes | |

OTHER PUBLICATIONS

Adam Lally and Paul Fodor, "Natural Language Processing With Prolog in the IBM Watson System", May 24, 2011, pp. 1-4.

(Continued)

*Primary Examiner* — Mahesh Dwivedi
*Assistant Examiner* — Johnese Johnson
(74) *Attorney, Agent, or Firm* — Daniel R. Simek

(57) ABSTRACT

A computer processor determines a root of a first element of a semantic model, in which a first relationship of the first element to a second element of the semantic model, is unknown. The computer processor generates a search token, based on applying morphological rules to the root of the first element and appending a preposition. The computer processor determines one or more regular expressions by applying the search token to search a source of unstructured data. The one or more regular expressions are in a form of a triple, having a subject, a predicate, and an object, and the computer processor applies the predicate of the triple as the first relationship of the first element of the semantic model to a second element of the semantic model.

16 Claims, 4 Drawing Sheets

(56) References Cited

OTHER PUBLICATIONS

SPI DST et al., "A Semantic Network of Production Rules in a System for Describing Computer Structures", IP.com Prior Art Database Technical Disclosure, Original Publication Date: Jun. 28, 1979, IPCOM000148062D, IP.com Electronic Publication: Mar. 28, 2007, Database entry Copyright (c) Software Patent Institute, pp. 1-34.

SPI DST et al., "Introduction to the Interactive Semantic Modeling System", IP.com Prior Art Database Technical Disclosure, Original Publication Date: Jan. 31, 1974, IPCOM000150967D, IP.com Electronic Publication: Apr. 19, 2007, Database entry Copyright (c) Software Patent Institute, pp. 1-24.

"wiki.dbpedia.org : About", DBpedia, accessed Nov. 8, 2013, Last Modification Sep. 17, 2013 by Christopher Sahnwaldt, <http://dbpedia.org/About>.

* cited by examiner

AUGMENTING SEMANTIC MODELS BASED ON MORPHOLOGICAL RULES

BACKGROUND OF THE INVENTION

The present invention relates generally to the field of organizing unstructured data, and more particularly to constructing a populated graph based on morphological rules applied to semantic models.

Data sets, accumulated by businesses or organizations over time, can become very large and complex. Additional information is derivable from analysis of a single large set of data, as opposed to multiple smaller sets with the same total amount of data. Analysis that determines trends, behaviors, correlations, or untapped opportunities, can add significant value to the business or organization.

Unstructured data, or unstructured information, is usually text-based and may not include a pre-defined data model. To determine and extract potential value from unstructured data, a semantic model may be applied. A semantic model is a form of conceptual data modeling, which represents objects or elements of a domain and the relationships between the elements. A semantic model is an additional layer of information that maps data elements and attributes of data elements into concepts that can be meaningfully interpreted without human intervention. Data in a semantic model is typically organized by a pair of objects and the relationship between them. The total set of elements representing concepts of a semantic model, comprise the taxonomy of classes we use to represent the real world. Together the elements and relationships are represented by an ontology—the vocabulary of the semantic model that provides the basis on which user-defined model queries are formed.

In a general sense, semantics is the study of the meaning behind the words. The context of a relationship between elements of a domain provides the information or knowledge of the domain.

SUMMARY

According to one embodiment of the present invention, a method, computer program product, and computer system for augmenting a semantic model from unstructured data is provided. A computer processor determines a root of a first element of a semantic model. The computer processor generates a search token, based on applying morphological rules to the root of the first element and appending a preposition. The computer processor determines at least one phrase, based at least in part, on an approximate match of the search token, which is applied to a set of unstructured data, and the computer processor applies a predicate of the at least one phrase as a relationship of the first element of the semantic model, to a second element of the semantic model.

DETAILED DESCRIPTION

Embodiments of the present invention recognize, that a semantic model may be used to describe entities, also referred to as elements, of a domain, and the relationship between the elements of the domain, to form an ontology of the domain. In some embodiments of the present invention, the ontology of the domain may be represented by a populated and labelled graph of the elements of the domain. Embodiments of the present invention apply morphological rules, using lemmatization and stemming of elements of a semantic model domain, to create a search token. The search token is based on the root of an element of the domain, which lacks a direction or relationship between another domain element. The search token, which is auto-generated using morphological rules, is applied to a search of one or more unstructured text sources. The search result may identify one or more regular expression sentences or phrases that contain a close approximation of the domain element(s) on which the search is based. The regular expression sentences are parsed into phrase-structure trees and non-open class parts of speech are removed from noun phrases to form a triple, which has the basic form of a subject, predicate, and object. For example, "corn-grows-in fields".

The predicate of the triple is applied to corresponding elements of the domain, which provides labels and direction to a previously unlabeled and undirected relationship of elements of the domain. Elements from the triple, obtained from the search result of one or more unstructured text sources, may be added to the semantic model domain. The implied relationship between the elements (subject and object) of the triple and the corresponding elements of the semantic model, may also be added to the domain, and depicted in the domain graph. Embodiments of the present invention apply the relationship of an approximate match of a regular expression, to the corresponding element of the semantic model, providing the relationship between elements of the semantic model. Having added relationships and elements, the semantic model may be depicted as a graph, in which the nodes of the graph correspond to the elements of the semantic model, and the edges of the graph correspond to the relationship between the nodes of the semantic model.

Figure 1:
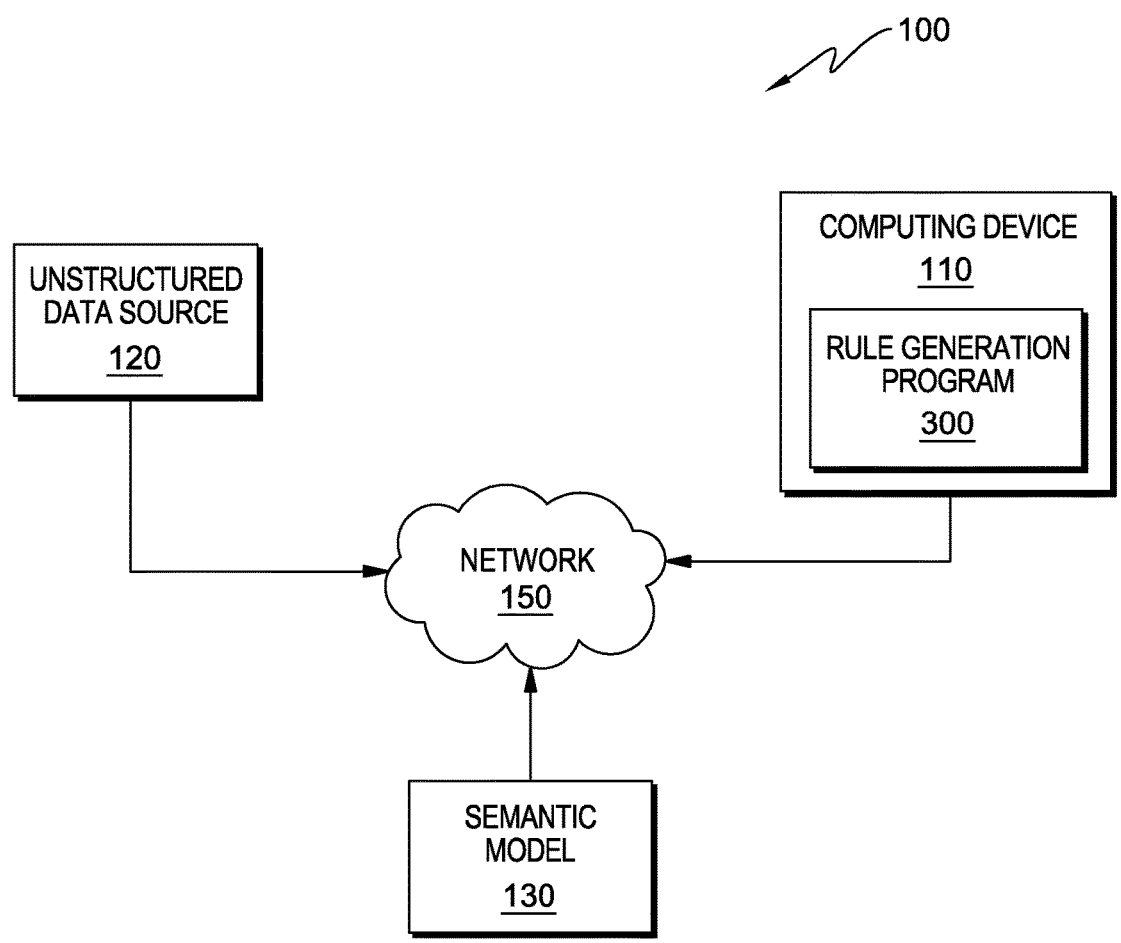
FIG. 1 is a functional block diagram illustrating a distributed natural language processing environment, in accordance with one embodiment of the present invention.

The present invention will now be described in detail with reference to the Figures. FIG. 1 is a functional block diagram illustrating a distributed natural language processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 1 includes computing device 110, unstructured data source 120, semantic model 130, all interconnected via network 150. Network 150 can be, for example, a local area network (LAN), a telecommunications network, a wide area network (WAN), such as the Internet, a virtual local area network (VLAN), or any combination that can include wired, wireless, or fiber optic connections. In general, network 150 can be any combination of connections and protocols that will support communications between computing device 110, unstructured data source 120, and semantic model 130, in accordance with embodiments of the present invention.

In the most general sense, a semantic model is a model that describes the meaning or relationship of elements of a domain. A domain can be thought of as a subject area of focus. A semantic model is often represented as a graph, and implemented as an ontology, which formally represent knowledge or concepts within a domain. A semantic model is a type of knowledge model that provides a way to abstract disparate data and information. Knowledge modeling describes the meaning of data, and provides an understanding of how different pieces of information relate to each other. Semantic models include information to interpret the meaning of instances without the need to know the structure, rules and constraints of the model. The semantic model consists of a network of entity concepts, referred to herein as elements, and the relationships between the elements. The elements are a particular idea or topic of focus, and the combination of elements and their relationships are often known as an ontology.

Semantic models enable users to ask questions of the information in a natural way, and help to identify patterns and trends within the information, to discover relationships between disparate pieces of information. Such semantic models are fact oriented and are typically expressed by binary relations between elements, whereas higher order relations are expressed as collections of binary relations. Typically binary relations have the form of triples: subject—relation type—object. For example: the Eiffel Tower—is located in—Paris.

Semantic model 130 includes elements of a domain, but lacks information regarding relationships between the elements and the direction of the relationships. Semantic model 130 may be small and simple, including only a few elements, or may include a very large number of elements with complex relationships. Representation of the domain associated with semantic model 130 may be depicted as a graph of nodes and edges, in which the elements of the domain are nodes, and the relationships between the nodes are represented by lines, or edges. The meaning of the nodes and determining the ontology of the domain is dependent upon determining the meaning associated with the edges of the graph, which correspond to the relationships between the elements. Embodiments of the present invention apply morphological rules to roots of elements of the domain, generating search tokens to search within the unstructured data for approximate matches of the element of the semantic model. The approximate matches substantially match the element of the semantic model, but are not necessarily an exact match. The search results may include multiple variations of the search tokens, in the form of regular expression sentences or phrases, which can be modified further to determine relationships between elements of the semantic model.

Unstructured data source 120 includes a volume of data that is not stored in a structured format. In some embodiments of the present invention, unstructured data source 120 includes text-based data that includes a wide variety of subject matter and topics, referred to herein as a set of unstructured data. The data within unstructured data source 120 may include elements of data, which may be considered subjects, with implied connection to other elements of data, which may be considered as objects; however, the direction of the connection and the relationship details are not organized or represented within unstructured data source 120. Unstructured data source 120 may include, but is not limited to, documents, files, reports, presentations, scientific studies, web content, articles, and book-content, and may be in PDF, word processing, spread sheet, page, or paragraph formats. Value may be associated with the connection and relationships between entity elements of unstructured data source 120, if the relationships can be determined.

Embodiments of the present invention provide an automated process for the construction of a detailed and populated graph with probabilities, in a Markov chain, based on morphological rules derived from, and executed against unstructured data, such as unstructured data source 120. A Markov chain undergoes transitions from one state to another in a random process, in which the next state depends only on the current state and not on the sequence of events or objects that preceded. Markov chains are often used in applications as statistical models of real-world processes.

Computing device 110 is a computing device that includes rule generation program 300, and is capable of operating program 300 in distributed natural language processing environment 100. Computing device 110 may be a management server, a web server, a mobile computing device, or any other electronic device or computing system capable of receiving and sending data. In other embodiments, computing device 110 may represent a computing system utilizing multiple computers as a server system, such as in a cloud computing environment. In another embodiment, computing device 110 may be a laptop computer, a tablet computer, a netbook computer, a personal computer (PC), a desktop computer, a personal digital assistant (PDA), a smart phone, or any programmable electronic device capable of communicating with unstructured data source 120 and semantic model 130, via network 150. In another embodiment, computing device 110 represents a computing system utilizing clustered computers and components (e.g., database server computer, application server computers, etc.) that act as a single pool of seamless resources when accessed within distributed processing environment 100. Computing device 110 may include internal and external hardware components, as depicted and described with reference to FIG. 4.

Rule generation program 300 selects an element of the semantic model and applies morphological rules, depending on the semantic analysis of the element. Rule generation program 300 determines the root and the part of speech of the element root, and applies morphological rules. Rule generation program 300 performs a search within an unstructured data source, such as unstructured data source 120, using the element root with morphological rules applied as a search expression, referred to herein as a search token. The results of the search include one or more regular expressions, which may be a sentence or phrase, having a format of a subject with a relationship to object, and may include descriptive adjectives and prepositional phrases. The relationship of the subject to the object of the sentence or phrase is referred to herein as the predicate, which is the part of a sentence or clause that expresses what is said of the subject of the sentence or clause. The predicate may be a verb or verb phrase, with or without objects, complements, and may include other parts of speech, for example, adverbs and prepositions.

Rule generation program 300 forms a phrase-structure tree of the regular expression(s), with various portions of the regular expression including labelling of the part of speech or type of phrase. Each phrase or word of the phrase-structure tree includes a probability associated with correctly determining the part of speech of the phrase or word, and a probability associated with the match between the parts of the phrase-structure tree and the search token. Rule generation program 300 extracts open-class words from the phrase-structure tree items and generates a triple, having the format of: noun—verb—noun; or more generally: subject—predicate—object. The predicate of the triple defines the relationship, and the direction of the relationship between the selected element of the sematic model and an element connected to the selected element. Additionally, the subject and object of the modified regular expression correspond to the type of the elements of the semantic model, and may be included in the semantic model and domain. As the process of rule generation program 300 is continually repeated, the elements and relationships from the unstructured data set, such as unstructured data source 120, are included in the semantic model and added to the domain. Probabilities between elements of the semantic model are determined, ultimately providing information and knowledge of the data from unstructured data source 120.

Figure 2A:
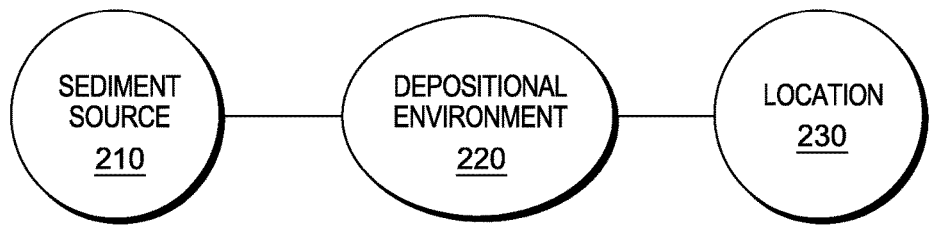
FIG. 2A is an exemplary functional block diagram illustrating elements of a domain, in accordance with an embodiment of the present invention.

FIG. 2A is an exemplary functional block diagram illustrating elements of a semantic model, in accordance with an embodiment of the present invention. The semantic model includes three elements, sediment source 210, depositional environment 220, and location 230. A semantic model may be represented by a graph, in which the elements of the model may be represented by nodes and the relationship between nodes may be represented by labeled lines, termed edges. The three elements of FIG. 2A, connected by two unlabeled lines, represent a simplistic semantic model, without relationship or direction of relationship, between the elements. Embodiments of the present invention apply morphological rules to a selected element, such as depositional environment 220, of the semantic model to generate regular expressions. The regular expressions are generated by searching unstructured data using variations of the root of the element word(s). Variations of the root of the element word(s) are determined by using stemming and lemmatization activities, and by applying morphological rules. Stemming reduces inflected words to their stem or root form, whereas lemmatization groups the different inflected forms of a word to enable analysis as a single item.

For example, selecting the semantic model element, depositional environment 220, stemming activity generates the root "deposi", on which words such as deposit, deposited, depositing, deposition, etc., are based on. Stemming activity of environment generates the root "env", for words such as environ, envelop, and environment, for example. The root words are affixed with search wildcards such as [A-Z,a-z]+, covering variations of the root word and other words or phrases related to the root word. Similarly, env[A-Z,a-z]+ may be added to match phrases with both root words deposi and env. The patterns of regular expressions may correspond with multiple variation of the search tokens, found in unstructured data, such as unstructured data source 120, and the variations may describe a "depositional environment". In the case of searching unstructured data using the root word patterns as search tokens, an exact match is not important. Rather, finding one or more sentences or phrases containing an approximate match of the search token is important and will offer relationship information that is applicable to the semantic model.

Applying morphological rules, which are exceptions to the orthographic rules used when breaking a word into its stem and modifiers, includes words with affixes of "ion", meaning the result of an action or process, for example, the word "connection". Connection may be stemmed to the base word "connect". The stem of the word "excitement" is excite, a verb, and the suffix "ment" converts the verb into the noun, excitement. Converting various morphologies of a word by stemming and lemmatization, to its root may also allow the inversion of a phrase, for example, the phrase "Internet connection", may be converted to "connect to the Internet". Using morphological rules allows construction of a noun—verb association.

If the word is intended as a verb in the semantic model, the past tense inflection forms of the word are considered with prepositions such as "on", or "by". If the word is intended as a noun in the model, then past tense will be avoided and prepositions such as "in" will be used. For the example of deposi[A-Z,a-z]+(env[A-Za-z]+), the token is considered as a noun and the preposition "in" is added to the end. The automated process of searching the unstructured data using the generated regular expression may result in multiple sentences or phrases that include information of interest to the originally selected element, depositional environment.

Once the sentences and phrases containing approximate matches to the tokens are identified, the sentences and phrases are parsed into phrase-structure trees. For example, one of the returned phrases may be "Halite deposited in the evaporitic lagoon." The phrase-structure tree generated for this phrase may resemble the information in Table 1:

TABLE 1

Example listing of parsing results of a regular expression.

```
<node prob="0.94551" span="Halite deposited in the evaporitic lagoon"
type="S">
  <node prob="1.0" span="Halite" type="NP">
      <node prob="0.72649" span="Halite" type="NNP"/>
  </node>
  <node prob="0.61448" span="deposited in the evaporitic lagoon"
type="VP">
      <node prob="0.74138" span="deposited" type="VBD"/>
      <node prob="0.99942" span="in the evaporitic lagoon"
      type="PP">
          <node prob="0.96635" span="in" type="IN"/>
          <node prob="1.0" span="the evaporitic lagoon"
          type="NP">
              <node prob="0.98995" span="the"
              type="DT"/>
              <node prob="0.45595" span="evaporitic"
              type="NN"/>
              <node prob="0.84920" span="lagoon"
              type="NN"/>
          </node>
      </node>
  </node>
</node>
```

Phrase-structure trees are used to break down a natural language sentence into its constituent phrase categories and constituent parts of speech. For example, referring to the sentence "Halite deposited in the evaporitic lagoon", of table 1, "halite", is a noun phrase that precedes the verb phrase "deposited in the evaporitic lagoon". The verb phrase includes the verb "deposited", and the prepositional phrase "in the evaporitc lagoon". The prepositional phrase includes the preposition "in", and the noun phrase "the evaporitic lagoon. The noun phrase "the evaporitic lagoon" includes the determiner "the", the adjective "evaporitic", and the noun "lagoon".

Table 1 also includes an attribute "prob", associated with the regular expression returned from the search of the unstructured data source using the morphological rules applied to the token. The attribute "prob" indicates the probability that the type determination of constituents of the sentence is correct. In some embodiments of the present invention, probabilities of correct word type may be used in achieving the objective of parsing a natural language sentence and obtaining a subject, predicate, and object, to form a triple. The probability of a word as a noun or verb may determine its likely use as a predicate or not. In another embodiment, probability may be derived by modifying the morphological rules to influence the number of potentially matching words. For example, instead of using the token "deposi", a change of the root to "depo" will produce additional matches with the token, but the precision of the resulting words from searching with the modified token may be affected. The probability in such cases may be assigned based on known numbers of words in a dictionary having the token root.

Noun phrases that precede or follow the search token "deposited in" are identified, and open class parts of speech, such as the determiners, pronouns, articles, etc., are removed. The result in this case is "Halite", preceding "deposited in", and "evaporitic lagoon", following the token "deposited in". Combining these, produces the triple "Halite deposited in evaporitic lagoon".

Figure 2B:
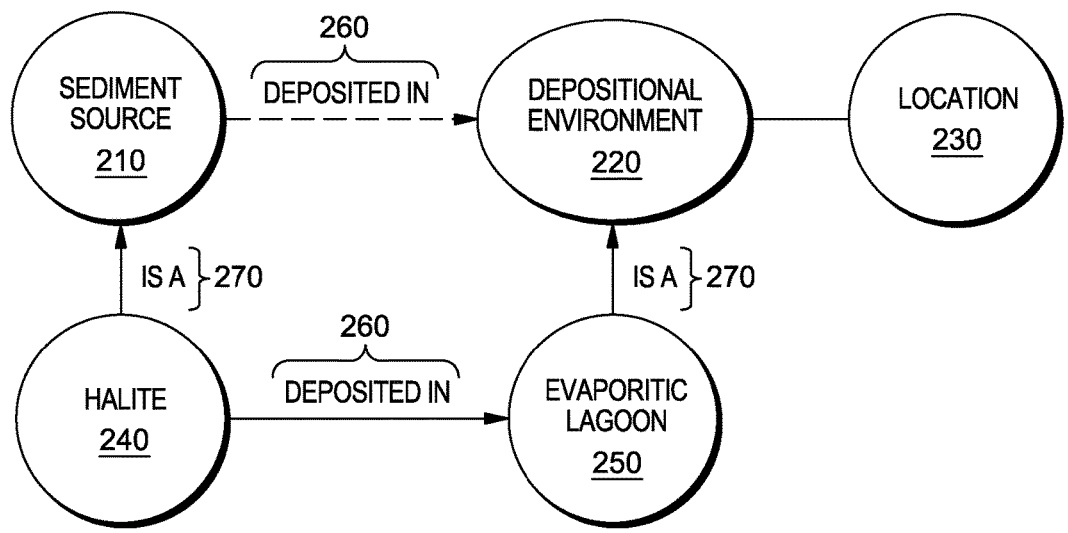
FIG. 2B is an exemplary functional block diagram illustrating elements and relationships between the elements of a domain, in accordance with an embodiment of the present invention.

FIG. 2B is an exemplary functional block diagram illustrating elements of a semantic model with directional relationships between the elements, in accordance with an embodiment of the present invention. The semantic model of FIG. 2B contains five elements including, sediment source 210, depositional environment 220, location 230, halite 240, evaporitic lagoon 250, and the verb phrase relationships, deposited in 260, and is a 270. The combination of the element, halite 240, the verb phrase relationship, deposited in 260, and the element, evaporitic lagoon 250, forms a triple having the format: subject—predicate—object. The triple, discussed in more detail in regard to FIG. 3, is a result of capturing noun phrases preceding and following a regular expression obtained from searching unstructured data, forming phrase-structure trees from the regular expression, and extracting non-open class parts of speech, such as articles, determiners, and pronouns.

Deposited in 260 establishes the relationship between noun phrases halite and evaporitic lagoon. Because halite is a type of sediment source, and because evaporitic lagoon is a type of depositional environment, the same relationship, deposited in 260, can be applied between sediment source 210 and depositional environment 220. Thus, using the pattern of a triple, a relationship between noun phrases of a generated regular expression can be applied to corresponding elements of the original semantic model, producing the triple: sediment source—deposited in—depositional environment.

Additionally, still using the pattern of a triple, subject—predicate—object, inferred relationships are determined from the generated regular expression. Using the pattern established with the token search, a relationship between the noun phrases of the search result regular expression and the noun phrases of the original semantic model, may be inferred. Based on the inference, the relationship: halite "is a" sediment source, which combines into the triple, halite 240, is a 270, and sediment source 210, may be concluded. Similarly, the same pattern infers the relationship that "evaporitic lagoon is depositional environment", which combines evaporitic lagoon 250, is a 270, and depositional environment 220. By locating "approximate" matches of sentences from searches of unstructured data, based on tokens derived from the relationship-free semantic model, relationships and direction of relationships are determined for elements of the semantic model, and additional elements of the unstructured data are added to the semantic model. A semantic model populated with relationships and probabilities, defining an ontology of at least part of the unstructured data, is produced by iterative selection of elements and repetition of these techniques.

Figure 3:
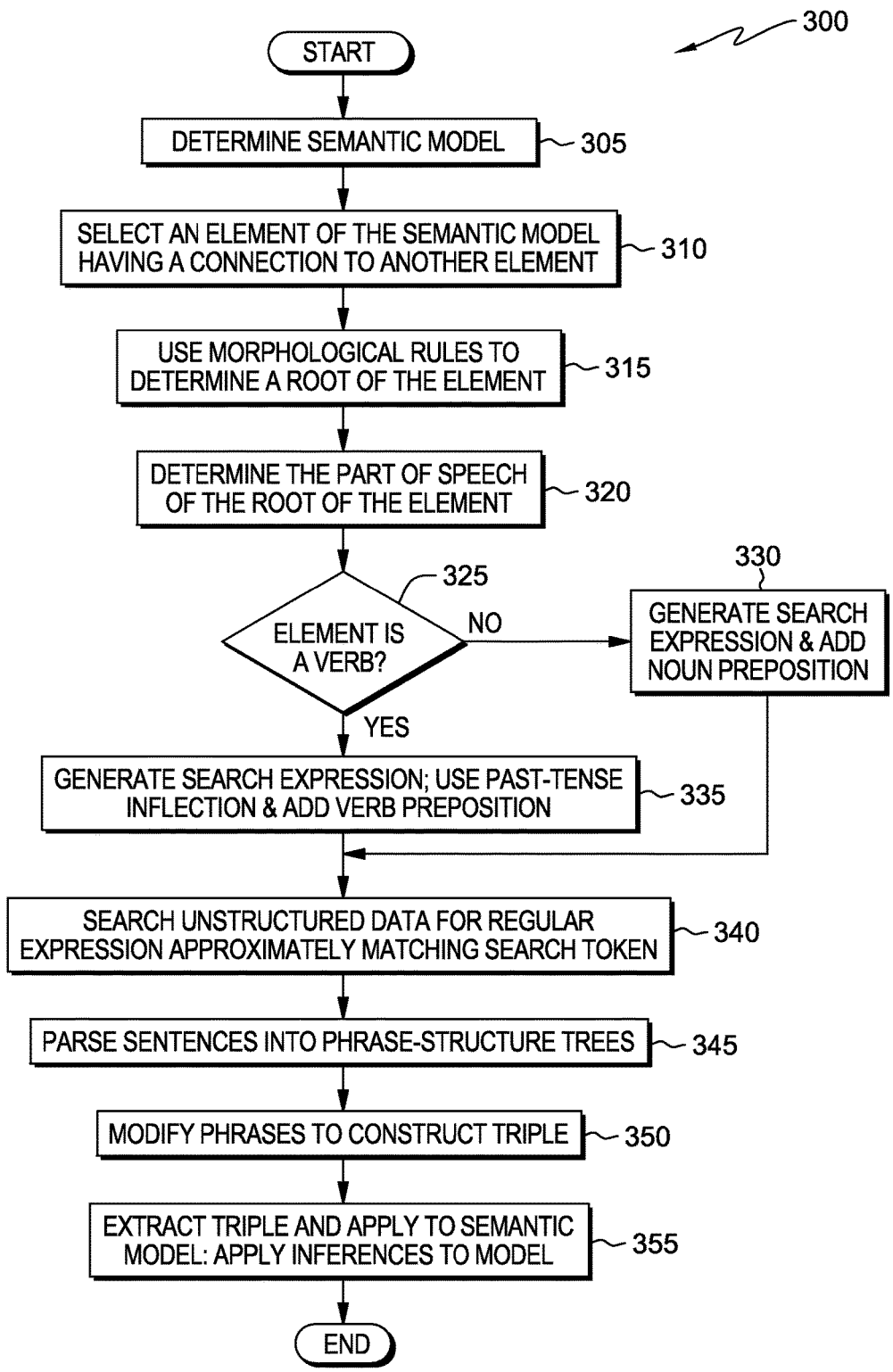
FIG. 3 illustrates operational steps of a rule generation program, operating on a computing device within the distributed natural language processing environment of FIG. 1, in accordance with an embodiment of the present invention.

FIG. 3 illustrates operational steps of rule generation program 300, operating on a computing device within distributed natural language processing environment 100 of FIG. 1, in accordance with an embodiment of the present invention. Rule generation program 300 determines a semantic model (step 305). The semantic model may be of any size and include entity elements, some of which may be connected, however the direction and specific relationship of the connection between elements is unknown, making the semantic model incomplete. By determining the semantic model, for example the model depicted in FIG. 2A, the elements of the semantic model are accessible and may be identified by rule generation program 300.

Rule generation program 300 selects an entity, or element, of the semantic model having a connection to a second entity of the model (step 310). In some embodiments of the present invention, the selection may be randomly made from all un-selected entities of the semantic model. In other embodiments, the entity may be selected on an alphabetical basis. In yet other embodiments, there may be user input involved in the selection of an element of the semantic model. Referring to the semantic model of FIG. 2A, rule generation program selects one of the entities, hereafter referred to as elements, of the semantic model. For example, rule generation program 300 selects the model element, depositional environment 220.

Having selected an element of the semantic model, rule generation program uses morphological rules to determine the root of the element (step 315). In linguistics, morphology includes the analysis and description of the structure of a language's linguistic units, such as root words, affixes, and parts of speech. Embodiments of the present invention apply morphological rules to determine the root of the selected element word(s). The root of the element is used, along with global affixes, as part of a search token. The morphological rules include removing suffixes and possibly prefixes, to determine the root of the element word(s). This is done by applying lemmatization and stemming tool activities to the word(s) of the selected element of the semantic model. Additionally, after determining the root, the order of words, for a multi-word element, may be changed to obtain a token that may prove more effective in producing regular expressions. For example, an element such as "Internet connections" may be analyzed by lemmatization to determine the lemma, or base form of the words. Lemmatization of the word "connections" determines the "ion" suffix to indicate the result of an action or process. The action or process in this example is "to connect", and determining the perfect past participle of "connection", and using an order rearrangement, produces the search token "connect to Internet".

For example, rule generation program 300 selects "depositional environment 220" from the semantic model of FIG. 2A. "Depositional" has several variations of a root word, which include, but may not be limited to: deposition, depositing, deposited, depositary, depositor, depositors, deposits, deposit, deposing, for example. Rule generation program 300 determines a root of "deposi", which, although not a word, can be used as a part of a search token. Similarly "environment" has root variations, such as environmental, environments, environ, etc., and rule generation program 300 determines a root of "environ".

Rule generation program 300 determines the part of speech of the root of the selected element (step 320). Some English words may be used as a noun or a verb. For example, the word deposit may be derived from the root "deposi", and deposit may serve as a noun, as in, "The deposit on the sand was salt." The word deposit, may also serve as a verb, as in, "I saw him deposit the check at the bank." Rule generation program 300 determines the most likely part of speech of the root as it occurs in the element of the semantic model. Parsing functions often include probabilities attached to each part of speech as determined in the phrase-structure tree. If the probability is within a particular pre-determined threshold, is marked as a noun, and there are no other verbs in the sentence, the parser determines the word as a verb.

In some embodiments of the present invention, determining the part of speech of a word may depend on the connection with other elements of the semantic model, and the direction of a relationship to be determined between the elements. Referring to FIG. 2A, for example, the element, depositional environment 220, is connected to the element sediment source 210. In some embodiments, semantic models that are applied to the English language, knowledge of elements of a domain takes the form of using a triple, with the format: subject—predicate—object. Within the triple the subject and object are nodes of the semantic model, such as sediment source and depositional environment, in FIG. 2A. The predicate, which may be a verb phrase, of a triple may be an approximation of a verb variation of the root of the selected element. In some embodiments, rule generation program 300 may use separate instances of the element root version as a noun and verb, to generate a search token. Rule generation program 300 determines the most likely part of speech of the element root, as used in the semantic model.

Having determined the most likely part of speech of the root word of the element, rule generation program 300 checks to determine if the root of the element is a verb (decision step 325), and determining that the root of the element is a verb (step 325, "YES" branch), rule generation program 300 generates a search expression, applies a past-tense inflection, and adds a verb preposition (step 335). Rule generation program 300 produces a past-tense inflection of the search term verb, and adds an appropriate verb preposition, such as "on", or "by", for example. The combination of the root word(s) global search affixes, and the appended preposition constitute a search expression, referred to as the search token. The search token is used to find a one or more phrases or sentences within a set of unstructured data, which are an approximate match of the search token.

For example, the root word "deposi" is determined to be used as a verb, and adjusted by rule generation program 300 to produce the past-tense inflection "deposi[*]ed, with the preposition "on" added. The past-tense inflection includes global characters to capture variations of the verb, and adding the preposition will identify expressions relating the verb phrase to a noun phrase. An example of a search token, to find regular expressions may be "deposi[*]ed+on". The root of the element term "environment" may also be added to improve the precision of the approximate matches from the search.

Alternatively, having determined the most likely part of speech of the root of the element to not be a verb, but rather a noun, (step 325, "NO" branch), rule generation program 300 generates a search expression and adds a noun preposition (step 330). Because rule generation program 300 has determined the part of speech of the root of the element to be a noun, forming a past-tense inflection of the root is ignored, and instead includes global search characters and appends a noun preposition, such as "in", to generate the search expression, also referred to as the search token, "deposi[*]+in". Additionally, the root of the element term "environment" may be added to more precisely match approximate search results, giving the search expression token: "deposi[*]+in, +environ[*]". Prepositions added to the root of an element are determined by use of a created language model of the entire domain, which may be a topic specific area of the entire corpus of unstructured data. The language model contains a high frequency of single token, double token, and triple token phrases (i.e., unigrams, bigrams, and trigrams). The language model tells us that "deposited in" occurs frequently within the corpus, and so is a valid variation that can be used in the example case, as a verb phrase.

The search token is derived by applying morphological rules to the words included in the selected element of the semantic model, generating a search token based on the most likely part of speech, and adding an appropriate preposition. In embodiments of the present invention, the process of generating the search token is performed by rule generation program 300, without intervention.

Rule generation program 300 uses the generated search token, and searches the unstructured data to find regular expressions approximately matching the search token (step 340). Rule generation program 300 applies the generated search token to search unstructured data for regular expression sentences that are an approximate match to the selected element of the semantic model, such as "depositional environment", in the example case discussed. The unstructured data includes text and may predominately include sentences from documents, files, presentations, articles, web pages, blogs, wikis, or other sources of unstructured data. The similarity to the search token does not have to be an exact match, rather, an approximate match is acceptable. An approximate match will include a subject or object that corresponds to the selected element of the semantic model, and may also include a subject or object that corresponds to an element connected to the selected element of the semantic model. Additionally, the approximate match will include a verb phrase indicating a relationship between the subject and object of the search result.

Receiving results from searching the unstructured data, rule generation program 300 parses sentences into phrase-structure trees (step 345). Results from the search performed on the unstructured data, using the generated search token, include regular expression sentences.

Parsing the sentences into phrase-structure trees includes identifying the parts of speech of the words of the search results sentences. Words and groups of words of the sentences are identified by rule generation program 300 as nouns, noun phrases, verbs, verb phrases, prepositions and prepositional phrases, determiners, articles, etc. In some embodiments of the present invention, rule generation program 300 determines a probability associated with the identifying the correct part of speech for the components of the phrase-structure tree. For example, Table 1 depicts a phrase-structure tree with components having associated probabilities (node prob=).

Having parsed the search results sentences into phrase-structure trees, rule generation program 300 modifies the phrases to construct a triple (step 350). A triple is intrinsic to English language, and possibly other languages, in which a subject is connected to an object by a predicate. This is illustrated graphically in FIG. 2A in which the subject, sediment deposits 210, is connected to an object, depositional environment 220, by a line. The line represents a relationship between the respective subject and object nodes. For example, a regular expression returned by search results of the unstructured data, may be "Halite deposited in the evaporitic lagoon". The sentence is composed of a subject phrase, "halite", and an object phrase, "the evaporitic lagoon", connected by a predicate phrase, "deposited in". Rule generation program 300 determines the noun phrases preceding and following the predicate to produce the triple, and refines or "smooths" the triple by extracting non-open class words. Open class words accept new words by processes such as compounding, inflection, derivation, and borrowing, whereas closed classes of words generally do not include expansion by word addition. Content words, or lexical words, (including nouns, verbs, adjectives, and most adverbs) are words that carry the content or the meaning of a sentence and are open-class words. Pronouns, articles, conjunctions, and determiners are considered non-open or closed class words. In the example "Halite deposited in the evaporitic lagoon", rule generation program 300 extracts the determiner "the" from the regular expression, producing the refined triple: "halite deposited in evaporitic lagoon".

Rule generation program 300 extracts the refined triple formed from the regular expression and applies the triple to the semantic model and adds inferences to the semantic model (step 355). The predicate of the refined triple "Halite deposited in evaporitic lagoon", is the verb phrase "deposited in", and the phrase establishes the relationship between noun phrases halite and evaporitic lagoon. Note that because the direction of "halite" to "evaporitic lagoon" is known, as well as the label for the relationship, the direction and relationship information can be applied to the subject and object of the original semantic model—sediment source to depositional environment. The regular expression from which the refined triple is generated is an approximate match of the search token, therefore, the subject, halite, can be determined to be a type of sediment source. Similarly the object of the triple, evaporitic lagoon, can be determined to be a type of depositional environment, and the same relationship, deposited in, between halite, and evaporitic lagoon, can be applied between the original elements of the semantic model, sediment source, and depositional environment. Thus, using the pattern of a triple, a relationship between noun phrases of a generated regular expression from an unstructured data source, is applied to corresponding elements of the semantic model, adding relationship and direction information to a semantic model connection previously lacking such detail. The result produces the triple: sediment source—deposited in—depositional environment.

In another embodiment, still using the pattern of a triple, subject—predicate—object, rule generation program 300 determines inferred relationships from the generated regular expression. Using the pattern established with the token search, a relationship between the noun phrases of the generated regular expression and the noun phrases of the original semantic model triple may be inferred. Based on the inference, and referring to FIG. 2B, the relationship: halite "is a" sediment source, forms a triple that includes: halite 240, is a 270, and sediment source 210 (FIG. 2A). From the triple, rule generation program 300 determines that "halite is a sediment source". This determination is facilitated by restricting parsing to domain specific data, such as the oil and gas (geology) domain, for example, and ignoring variations that occur with low frequency. Similarly, the same pattern infers the relationship that "evaporitic lagoon is a depositional environment", which combines evaporitic lagoon 250, is a 270, and depositional environment 220.

By locating "approximate" matches of sentences from searches of unstructured data, based on search tokens derived from a root element of the relationship-free semantic model, relationships and direction of relationships are determined for elements of the semantic model, and additional elements of the unstructured data are added to the semantic model. A semantic model populated with relationships and probabilities, defining an ontology of at least part of the corpus of unstructured data, is produced by iterative selection of elements of the semantic model, and repetition of these techniques.

Figure 4:
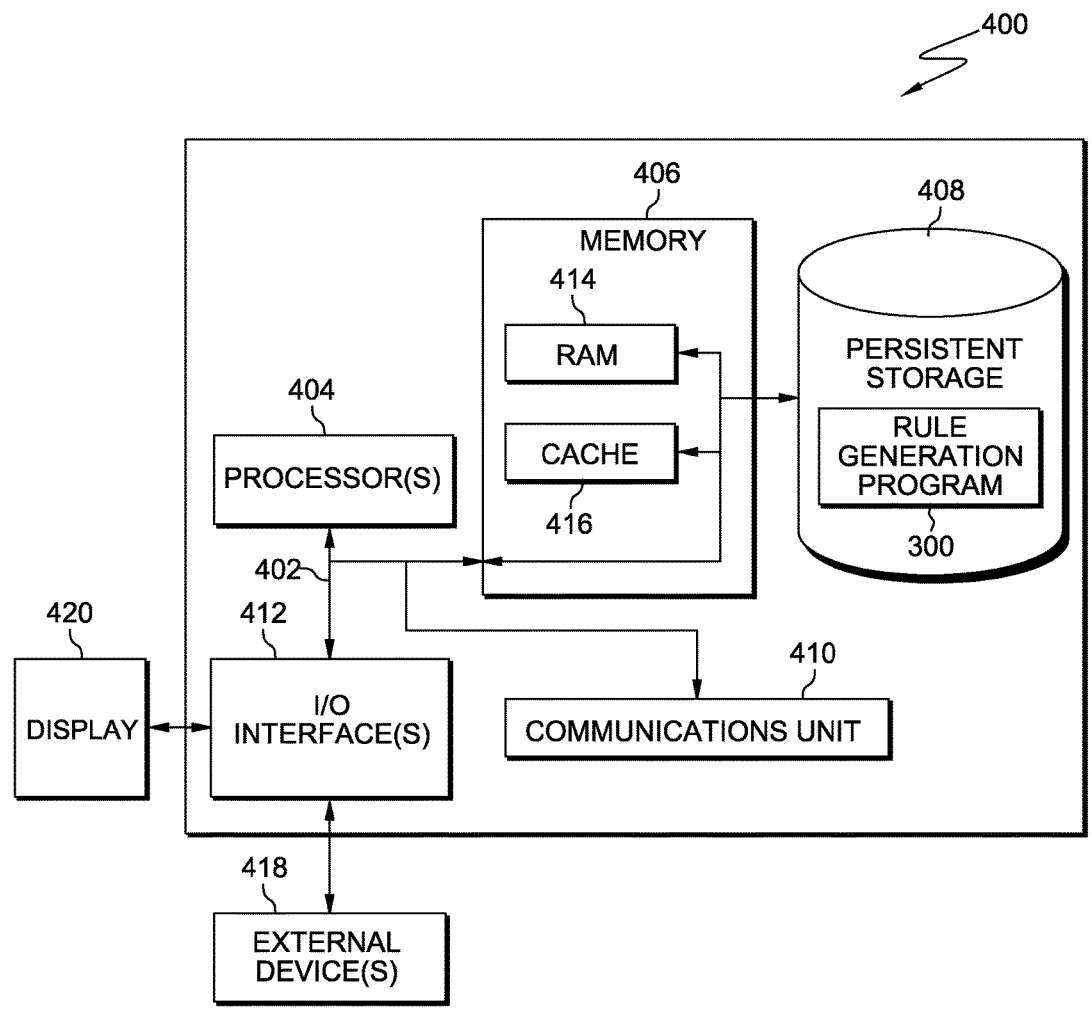
FIG. 4 depicts a block diagram of components of a computing device capable of operating the rule generation program, in accordance with an embodiment of the present invention.

FIG. 4 depicts a block diagram of components of computing system 400 capable of operating the rule generation program 300, in accordance with an embodiment of the present invention. It should be appreciated that FIG. 4 provides only an illustration of one implementation and does not imply any limitations with regard to the environments in which different embodiments may be implemented. Many modifications to the depicted environment may be made. Computing system 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Rule generation program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed natural language processing environment 100. In these examples, communications unit 410 includes one or more network interface cards. Communications unit 410 may provide communications through the use of either or both physical and wireless communications links. Rule generation program 300 may be downloaded to persistent storage 408 through communications unit 410.

I/O interface(s) 412 allows for input and output of data with other devices that may be connected to computing device system 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., Rule generation program 300 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for augmenting a semantic model from unstructured data, the method comprising:
   determining, by a computer processor, a root of a first element selected from a domain of a semantic model, wherein the domain includes a plurality of elements that lack relationship information between the plurality of elements;
   generating, by the computer processor, a search token, based at least in part on morphological rules applied to the root of the first element and a preposition added to the root of the first element, wherein a selection of the preposition that is added to the root of the first element depends upon whether the root is determined as a noun or a verb, as root occurs in the first element of the domain of the semantic model;
   performing, by the computer processor, a search of one or more unstructured data sources, based on the search token that is generated;
   determining, by the computer processor, whether results of the search include at least one phrase that contains an approximate match to the search token;
   in response to determining the results of the search include at least one phrase that contains an approximate match to the search token, generating a triple from the at least one phrase, and adding the triple to the semantic model; and
   adding, by the computer processor, a predicate of the triple to a second element of the domain of the semantic model forming a second triple, wherein the predicate of the triple expresses a relationship between the first element of the domain of the semantic model and the second element of the domain of the semantic model.

2. The method of claim 1, further comprising:
   determining, by the computer processor, a second relationship between at least one of: a third element of the at least one phrase and a fourth element of the at least one phrase, and a corresponding element of the semantic model, based on the determining of at least one phrase that contains an approximate match to the search token; and
   adding to the domain of the semantic model, by the computer processor, at least one of: the third element of the at least one phrase and the fourth element of the at least one phrase, and the second relationship.

3. The method of claim 1, further comprising:
   parsing, by the computer processor, the at least one phrase to form a phrase-structure tree;
   determining, by the computer processor, a type of phrase for each portion of the phrase-structure tree, and a part of speech for each word of each portion of the phrase-structure tree;
   determining, by the computer processor, a probability of an accurate determination of the type of phrase and part of speech of each portion of the phrase-structure tree; and
   generating, by the computer processor, a triple from the phrase-structure tree based on the parsing, the determining of the type of phrase and the part of speech, and the determining of the probability of the accurate determination of the type of phrase and the part of speech, wherein the triple includes a subject, a predicate, and an object.

4. The method of claim 3, wherein determining, by the computer processor, the type of phrase and the part of speech for each portion of the phrase-structure tree further comprises:
   applying the morphological rules to each portion of the phrase-structure tree, wherein the morphological rules include removing non-open class parts of speech from the at least one phrase of the phrase-structure tree to form the triple; and
   generating, by one or more processors, a graph corresponding to an ontology of the domain in which a first node corresponds to a subject of the triple and a second node corresponds to an object of the triple, and an edge corresponds to a relationship between the subject of the triple and the object of the triple, wherein the edge of the graph includes a probability associated with the relationship, forming a Markov chain.

5. The method of claim 1, wherein the at least one phrase includes a fifth element that contains an approximate match to the first element of the semantic model and a sixth element that contains an approximate match to the second element of the semantic model.

6. The method of claim 1, further comprising:
   generating, by the computer processor, a graph based on the first element of the domain of the semantic model and the second element of the domain of the semantic model, and a predicate of the triple that is derived from the at least one phrase, wherein the first element and the second element represent nodes of the graph, and the predicate of the triple represents an edge of the graph by which the nodes are connected; and
   adding to the graph, by the computer processor, at least one of a subject of the at least one phrase and an object of the at least one phrase, which corresponds to at least one of: the first element of the domain of the semantic model and the second element of the domain of the semantic model.

7. The method of claim 1, wherein the search token includes past tense inflections of the root of the first element, based on a determination that the root of the first element is a verb.

8. A computer program product for augmenting a semantic model from unstructured data, the computer program product comprising:
a computer readable storage medium having program instructions embodied therewith, wherein the program instructions are executable by a computer processor to cause the computer processor to perform a method comprising:
determining a root of a first element selected from a domain of a semantic model, wherein the domain includes a plurality of elements that lack relationship information between the plurality of elements;
generating a search token, based at least in part on morphological rules applied to the root of the first element and a preposition added to the root of the first element, wherein a selection of the preposition that is added to the root of the first element depends upon whether the root is determined as a noun or a verb, as the root occurs in the first element of the domain of the semantic model;
performing a search of one or more unstructured data sources, based on the search token that is generated;
determining whether results of the search, at least one phrase that contains an approximate match to the search token;
in response to determining the results of the search include at least one phrase that contains an approximate match to the search token, generating a triple from the at least one phrase, and adding the triple to the semantic model; and
adding a predicate of the triple, to a second element of the domain of the semantic model forming a second triple, wherein the predicate of the triple expresses a relationship between the first element of the domain of the semantic model and the second element of the domain of the semantic model.

9. The computer program product of claim 8, further comprising:
determining a second relationship between at least one of: a third element of the at least one phrase and a fourth element of the at least one phrase, and a corresponding element of the semantic model, based on the determining of at least one phrase that contains an approximate match to the search token; and
adding to the domain of the semantic model, at least one of: the third element of the at least one phrase and the fourth element of the at least one phrase, and the second relationship.

10. The computer program product of claim 8, further comprising:
parsing the at least one phrase to form a phrase-structure tree;
determining a type of phrase for each portion of the phrase-structure tree, and a part of speech for each word of each portion of the phrase-structure tree;
determining a probability of an accurate determination of the type of phrase and part of speech of each portion of the phrase-structure tree; and
generating a triple from the phrase-structure tree based on the parsing, the determining of the type of phrase and the part of speech, and the determining of the probability of the accurate determination of the type of phrase and the part of speech, wherein the triple includes a subject, a predicate, and an object.

11. The computer program product of claim 8, further comprising:
generating a graph based on the first element of the domain of the semantic model and the second element of the domain of the semantic model, and a predicate that is derived from the at least one phrase, wherein the first element and the second element represent nodes of the graph, and the predicate represents an edge of the graph by which the nodes are connected; and
adding to the graph at least one of a subject of the at least one phrase and an object of the at least one phrase, which corresponds to at least one of: the first element of the domain of the semantic model and the second element of the domain of the semantic model.

12. The computer program product of claim 8, wherein the search token includes past tense inflections of the root of the first element, based on a determination that the root of the first element is a verb.

13. A computer system for augmenting a semantic model from unstructured data, the computer system comprising:
one or more computer processors;
one or more computer readable storage media; and
program instructions stored on the computer readable storage media for execution by at least one of the one or more processors, the program instructions comprising:
program instructions to determine a root of a first element selected from a domain of a semantic model, wherein the domain includes a plurality of elements that lack relationship information between the plurality of elements;
program instructions to generate a search token, based at least in part on morphological rules applied to the root of the first element and a preposition added to the root of the first element, wherein a selection of the preposition that is added to the root of the first element depends upon whether the root is determined as a noun or a verb, as the root occurs in the first element of the domain of the semantic model;
program instructions to perform a search of one or more unstructured data sources, based on the search token that is generated;
program instructions to determine whether results of the search include at least one phrase that contains an approximate match to the search token;
in response to determining the results of the search include at least one phrase that contains an approximate match to the search token, program instructions to generate a triple from the at least one phrase, and adding the triple to the semantic model; and
program instructions to add a predicate of the triple to a second element of the domain of the semantic model forming a second triple, wherein the predicate of the triple expresses a relationship between the first element of the domain of the semantic model and the second element of the domain of the semantic model.

14. The computer system of claim 13, further comprising:
program instructions to determine a second relationship between at least one of: a third element of the at least one phrase and a fourth element of the at least one phrase, and a corresponding element of the semantic model, based on the determining of at least one phrase that contains an approximate match to the search token; and
program instructions to add to the domain of the semantic model, at least one of: the third element of the at least one phrase and the fourth element of the at least one phrase, and the second relationship.

15. The computer system of claim 13, further comprising:

program instructions to parse the at least one phrase to form a phrase-structure tree;

program instructions to determine a type of phrase for each portion of the phrase-structure tree, and a part of speech for each word of each portion of the phrase-structure tree;

program instructions to determine a probability of an accurate determination of the type of phrase and part of speech of each portion of the phrase-structure tree; and program instructions to generate a triple from the phrase-structure tree based on the parsing, the determining of the type of phrase and the part of speech, and the determining of the probability of the accurate determination of the type of phrase and the part of speech, wherein the triple includes a subject, a predicate, and an object.

16. The computer system of claim 13, further comprising:

program instructions to generate a graph based on the first element of the domain of the semantic model and the second element of the domain of the semantic model, and a predicate that is derived from the at least one phrase, wherein the first element and the second element represent nodes of the graph, and the predicate represents an edge of the graph by which the nodes are connected; and program instructions to add to the graph at least one of a subject of the at least one phrase and an object of the at least one phrase, which corresponds to at least one of: the first element of the domain of the semantic model and the second element of the domain of the semantic model.

* * * * *